United States Patent
Peterson et al.

(10) Patent No.: US 10,533,610 B1
(45) Date of Patent: Jan. 14, 2020

(54) GAS TURBINE ENGINE FAN STAGE WITH BEARING COOLING

(71) Applicant: Florida Turbine Technologies, Inc., Jupiter, FL (US)

(72) Inventors: Ross H Peterson, Palm Beach Gardens, FL (US); John A Orosa, Palm Beach Gardens, FL (US); Robert A Ress, Jr., Carmel, IN (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 84 days.

(21) Appl. No.: 15/967,684

(22) Filed: May 1, 2018

(51) Int. Cl.
| F16C 7/06 | (2006.01) |
| F16C 37/00 | (2006.01) |
| F02C 7/06 | (2006.01) |
| F02C 7/18 | (2006.01) |
| F02C 7/28 | (2006.01) |
| F16C 19/36 | (2006.01) |
| F16C 33/80 | (2006.01) |

(52) U.S. Cl.
CPC .............. *F16C 37/007* (2013.01); *F02C 7/06* (2013.01); *F02C 7/18* (2013.01); *F02C 7/28* (2013.01); *F16C 19/361* (2013.01); *F16C 33/80* (2013.01); *F05D 2220/323* (2013.01); *F05D 2240/50* (2013.01); *F05D 2240/55* (2013.01); *F05D 2260/221* (2013.01); *F16C 2360/24* (2013.01)

(58) Field of Classification Search
None
See application file for complete search history.

(56) References Cited

U.S. PATENT DOCUMENTS

| 4,683,714 | A | * | 8/1987 | Thebert | F01D 25/18 |
| | | | | | 184/6.11 |
| 4,827,713 | A | * | 5/1989 | Peterson | F01D 17/105 |
| | | | | | 415/150 |
| 5,113,670 | A | * | 5/1992 | McAuliffe | F01D 25/125 |
| | | | | | 417/406 |
| 5,639,211 | A | * | 6/1997 | Bintz | F01D 5/10 |
| | | | | | 415/173.7 |
| 9,416,674 | B1 | * | 8/2016 | Ebert | F16J 15/342 |
| 2009/0324394 | A1 | * | 12/2009 | Weaver | F01D 11/001 |
| | | | | | 415/173.7 |
| 2010/0143103 | A1 | * | 6/2010 | Sellars | F01D 11/122 |
| | | | | | 415/173.4 |
| 2010/0166545 | A1 | * | 7/2010 | Schuler | F01D 25/06 |
| | | | | | 415/189 |
| 2010/0196143 | A1 | * | 8/2010 | Walker | F04D 19/022 |
| | | | | | 415/144 |
| 2011/0070074 | A1 | * | 3/2011 | Schabowski | F01D 11/08 |
| | | | | | 415/174.5 |

(Continued)

*Primary Examiner* — Michael Lebentritt
(74) *Attorney, Agent, or Firm* — Koenig IP Works, PLLC

(57) ABSTRACT

An aero gas turbine engine with a fan stage and a bearing rotatably supporting the fan stage, where the bearing is cooled by passing cooling air through the bearing, and the spent bearing cooling air is re-injected into the air flow path at a location where the effect is minimalized. The location is just downstream from a leading edge of a stator vane and along a pressure side surface of the vane. A fine mist of oil can be discharged into the bearing cooling air to also lubricate the bearing, where both the oil and the spent cooling air is reintroduced into the air flow path.

12 Claims, 2 Drawing Sheets

(56) References Cited

U.S. PATENT DOCUMENTS

| | | | | |
|---|---|---|---|---|
| 2012/0011824 A1* | 1/2012 | Cigal | .................. | F01D 9/065 60/39.08 |
| 2014/0099188 A1* | 4/2014 | Bordne | .................. | F01D 25/18 415/112 |
| 2014/0248129 A1* | 9/2014 | Merry | .................. | F01D 25/162 415/115 |
| 2014/0248133 A1* | 9/2014 | Ebert | .................. | F01D 17/105 415/145 |
| 2016/0238075 A1* | 8/2016 | Clark | .................. | F16C 33/6677 |
| 2017/0044909 A1* | 2/2017 | Riazantsev | .................. | F01D 5/187 |
| 2017/0226894 A1* | 8/2017 | Ganiger | .................. | F01D 25/162 |
| 2017/0306795 A1* | 10/2017 | Davis | .................. | F01D 25/125 |
| 2017/0363100 A1* | 12/2017 | Ulrichsohn | .................. | C10M 103/04 |
| 2018/0266276 A1* | 9/2018 | Phillips | .................. | F02C 7/06 |
| 2018/0355742 A1* | 12/2018 | Telman | .................. | F01D 5/187 |
| 2019/0063243 A1* | 2/2019 | Lemaire | .................. | F01D 9/041 |

\* cited by examiner

GAS TURBINE ENGINE FAN STAGE WITH BEARING COOLING

GOVERNMENT LICENSE RIGHTS

This invention was made with Government support under contract number W31P4Q-09-A-0016 awarded by the US Army. The Government has certain rights in the invention.

CROSS-REFERENCE TO RELATED APPLICATIONS

None.

BACKGROUND OF THE INVENTION

Field of the Invention

The present invention relates generally to a gas turbine engine, and more specifically to a small aero gas turbine engine with bearing cooling.

Description of the Related Art Including Information Disclosed Under 37 CFR 1.97 and 1.98

In a gas turbine engine, a rotor having a compressor and a gas turbine is supported by bearings. In an aero gas turbine engine, a fan stage is also rotatably connected to the rotor and includes a row of fan blades and a row of stator vanes downstream. Compressed air from the compressor flows into a combustor to burn with a fuel and produce a hot gas stream that is passed through the gas turbine to drive both the compressor and the fan blades. The fan blades contribute thrust to propel the aircraft. An air flow from the fan blades flows divides into a bypass stream and a core stream. In some situations, the bearings require cooling because of the high temperatures associated with the friction and windage generated by the bearing itself.

BRIEF SUMMARY OF THE INVENTION

An aero gas turbine engine with a fan stage and a bearing rotatably supporting the fan stage, where the bearing is cooled by passing cooling air through the bearing, and the spent bearing cooling air is re-injected into the flow stream at a location where the effect is minimalized. The location is just downstream from a leading edge of a stator vane and along a pressure side surface of the vane.

In another embodiment, a fine mist of oil can be merged into the bearing cooling air to cool and lubricate the bearing.

DETAILED DESCRIPTION OF THE INVENTION

The present invention is a small aero gas turbine engine with a fan stage and with bearing cooling where the spent bearing cooling air is re-injected into the flow path of the air flow from the fan blades and at a location to minimalize the effect.

Figure 1:
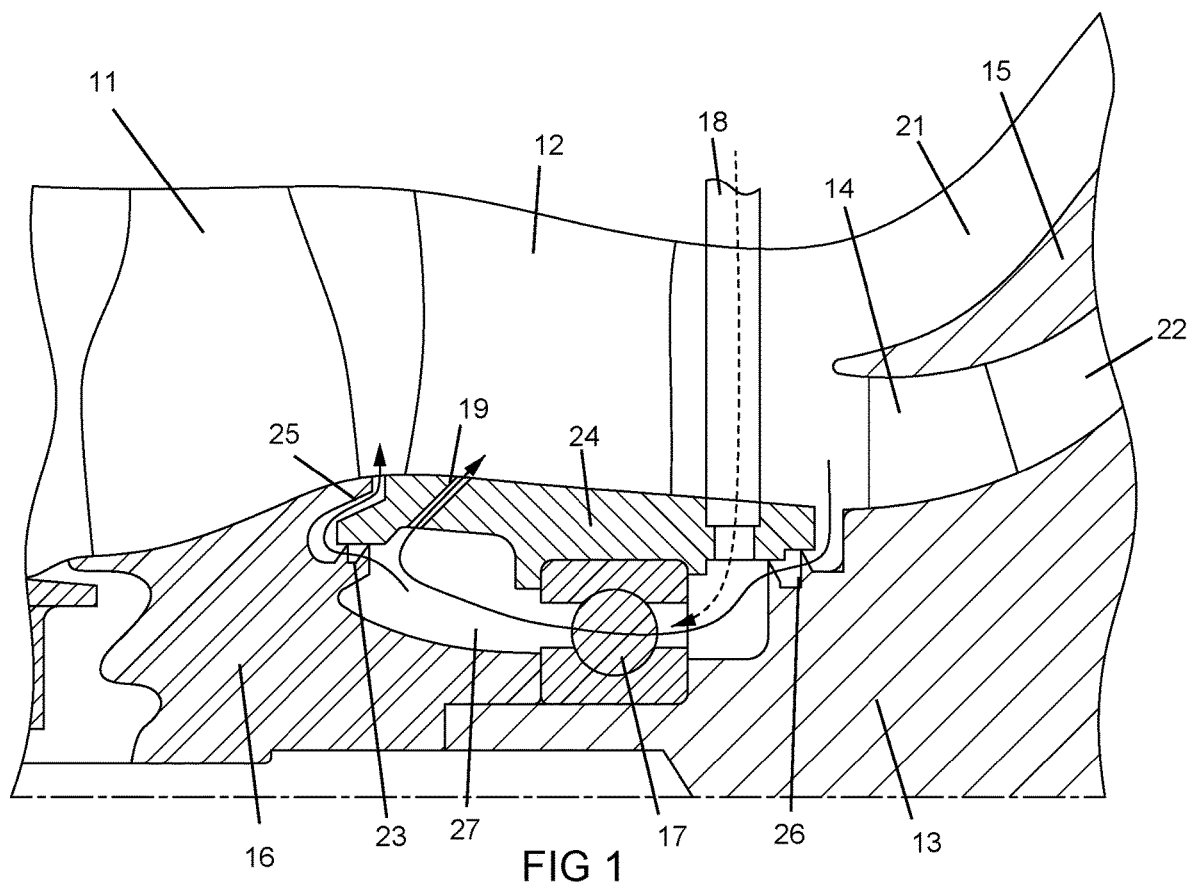
FIG. 1 shows an embodiment of the gas turbine engine fan stage with spent bearing cooling air re-injection of the present invention.

FIG. 1 shows an embodiment of the aero gas turbine engine with bearing cooling. A fan stage includes a row of fan blades 11 followed by a row of stator vanes 12. A rotor 13 supports a compressor with a row of rotor blades 14 and a shroud 15 that defines a compressed air flow path 22 leading to a combustor. A bypass channel 21 is formed outside of the shroud 15. A fan stage rotor 16 supports the fan stage fan blades 11 and is secured to a forward end of the main rotor 13. The fan stage stator vanes 12 include an inner shroud or endwall 24. A roller bearing 17 supports the rotors 13 and 16 in which an inner race is supported on the rotor 13 with an outer race supported on the inner shroud 24 of the vanes 12. The inner shroud 24 includes a forward labyrinth seal 25 and an aft labyrinth seal 26 that forms seals between the rotor and the stator of the fan stage.

Cooling of the bearing 17 is done using compressed air from downstream of the fan stage stator vanes 12 in which some of the air is leaked through the aft labyrinth seal 26 and flows into a bearing cavity 27 formed between the vane inner shroud 24 and the rotor 16 and 13 in which the bearing 17 is located. The pressure of the air downstream from the stator vanes 12 is high enough to flow as represented by the solid arrows in FIG. 1 due to the stator vanes 12 decreasing the velocity of the air flow which also increases the air flow pressure. A fine mist of oil can also be sprayed into the bearing cooling air to lubricate the bearing 17.

An oil supply tube 18 delivers the oil to the bearing cavity 27 in which the bearing 17 is located. The oil supply tube 18 is shown in FIG. 1 to be located downstream from the stator vanes 12 in the air flow path. The oil supply tube 18 can be elliptical in cross sectional shape in order to be more aerodynamic in the air flow path. The oil supply tube 18 can also be located in the stator vane airfoil.

The bearing cooling air passes through the bearing along with the mist of oil, and then is discharged back into the air flow path through a number of discharge holes 19 located in a forward side of the inner shroud 24 of the stator vanes 12. The spent bearing cooling air and the mist of oil are both discharged into the air flow path through the stator vanes 12. The location of these discharge holes 19 are selected such that the discharge of the spent bearing cooling air back into the air flow path has a minimal effect.

Figure 2:
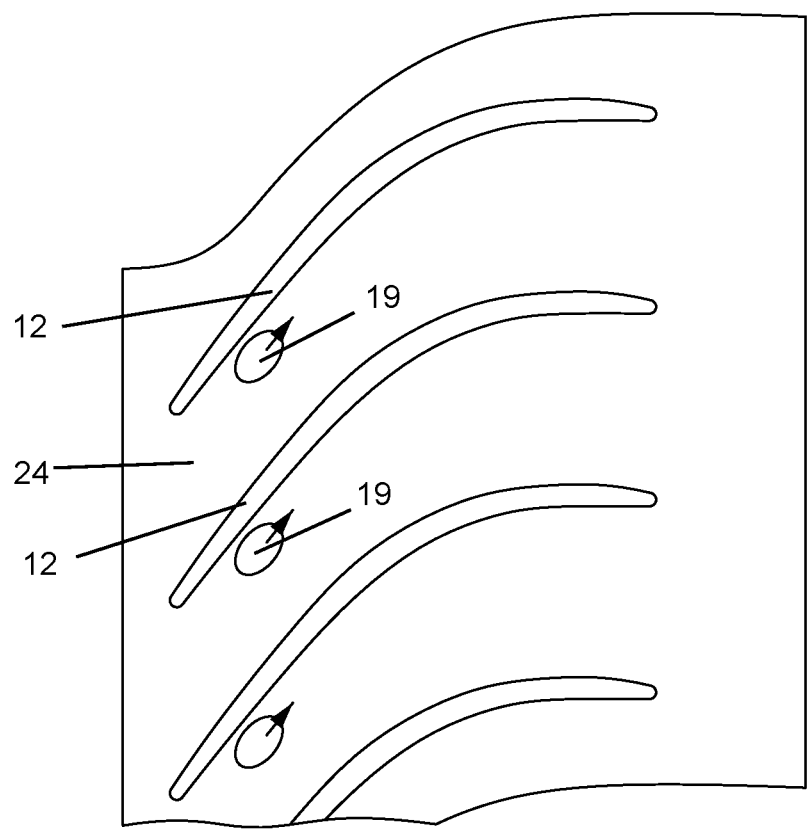
FIG. 2 shows another top view of a section of the stator vanes of the fan stage with locations of the spent bearing cooling air re-injection holes of the present invention.

FIG. 2 shows the location of the discharge holes 19 to be just downstream from the leading edge of the stator vane airfoils and along the pressure side wall of the airfoils. The number of discharge holes 19 can vary depending on the cooling air flow required. In the embodiment of the present invention, the number of discharge holes 19 is the same as the number of stator vanes 12 in the row. As seen in FIG. 1, some of the spent bearing cooling air also flows through the forward labyrinth seal 25 as leakage, and is discharged back into the air flow path upstream of the discharge holes 19.

The oil delivered to the bearing can be misted within the bearing cavity 27 of the bearing to provide lubrication. A small tube can be used to deliver the oil, and then a misting device at the end of the tube inside of the bearing cavity 27 can be used to produce a fine mist that mixes with the bearing cooling air to pass through the bearing 17.

The invention claimed is:
1. A gas turbine engine comprising:
   a fan stage with a row of rotor blades and a row of stator vanes;
   a bearing cavity formed between an inner shroud of the stator vanes and a rotor of the fan stage;

a first seal between a stator and a rotor of the gas turbine engine, the first seal being located adjacent to the bearing cavity;

a bearing within the bearing cavity; and, a plurality of cooling air discharge holes in the stator vane inner shroud, the plurality of cooling air discharge holes having an inlet connected to the bearing cavity and an outlet on a surface of the inner shroud to discharge spent cooling air from the bearing into the air flow path through the stator vanes.

2. The gas turbine engine of claim 1, and further comprising:

a first labyrinth seal located adjacent to the bearing cavity; and, the first labyrinth seal having a leakage flow of compressed air from the air flow path that is passed through the bearing as bearing cooling air.

3. The gas turbine engine of claim 1, and further comprising:

each of the plurality of cooling air discharge holes opens onto the inner shroud near to a leading edge of the airfoils of the stator vanes and along a pressure side wall of the airfoils.

4. The gas turbine engine of claim 1, and further comprising:

the number of cooling air discharge holes is equal to a number of airfoils in the stator vanes.

5. The gas turbine engine of claim 1, and further comprising:

each of the plurality of cooling air discharge holes is slanted in an aftward direction of the air flow path through the stator vanes.

6. The gas turbine engine of claim 1, and further comprising:

an oil delivery tube opening into the bearing cavity upstream of the bearing; and, oil delivered from the oil delivery tube to the bearing cavity for lubrication of the bearing.

7. A process for cooling a bearing in a fan stage of a gas turbine engine, the fan stage comprising a plurality of fan blades upstream from a plurality of stator vanes and a bearing to rotatably support the fan stage, the process comprising the steps of:

compressing air with rotation of the fan blades;

passing the compressed air from the fan blades through the stator vanes;

bleeding off a portion of the compressed air from the stator vanes as bearing cooling air;

passing the bearing cooling air through a bearing cavity to cool the bearing; and, discharging the spent bearing cooling air into the air flow stream passing through the stator vanes.

8. The process for cooling a bearing in a fan stage of a gas turbine engine of claim 7, and further comprising the step of:

discharging the spent bearing cooling air through a plurality of discharge holes located in an inner shroud of the stator vanes at a location adjacent to a pressure side wall of the stator vane airfoils.

9. The process for cooling a bearing in a fan stage of a gas turbine engine of claim 7, and further comprising the step of:

discharging the spent bearing cooling air through a plurality of discharge holes located in an inner shroud of the stator vanes at a location near a leasing edge of the stator vane airfoils and adjacent to a pressure side wall of the stator vane airfoils.

10. The process for cooling a bearing in a fan stage of a gas turbine engine of claim 8, and further comprising the step of:

discharging the spent bearing cooling air through a number of discharge holes equal to a number of stator vanes.

11. The process for cooling a bearing in a fan stage of a gas turbine engine of claim 7, and further comprising the step of:

bleeding off a portion of the compressed air from the stator vanes as bearing cooling air as leakage air through an aft labyrinth seal.

12. The process for cooling a bearing in a fan stage of a gas turbine engine of claim 7, and further comprising the step of:

discharging some of the spent bearing cooling air through a forward labyrinth seal.

* * * * *